US012086528B2

United States Patent
Halle et al.

(10) Patent No.: US 12,086,528 B2
(45) Date of Patent: Sep. 10, 2024

(54) SECURE FINGERPRINTING OF A TRUSTED PHOTOMASK

(71) Applicant: International Business Machines Corporation, Armonk, NY (US)

(72) Inventors: Scott David Halle, Slingerlands, NY (US); Gauri Karve, Cohoes, NY (US); Effendi Leobandung, Stormville, NY (US); Gangadhara Raja Muthinti, Albany, NY (US); Ravi K. Bonam, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 17/450,325

(22) Filed: Oct. 8, 2021

(65) Prior Publication Data

US 2023/0116390 A1  Apr. 13, 2023

(51) Int. Cl.
*G06F 30/398* (2020.01)
*G06F 21/44* (2013.01)

(52) U.S. Cl.
CPC ............ *G06F 30/398* (2020.01); *G06F 21/44* (2013.01)

(58) Field of Classification Search
CPC ...... G06F 30/398; G06F 21/44; G06F 21/445; G06F 21/86; G06F 21/73; G03F 7/70451; G03F 9/00; G03F 9/708; G03F 1/76
USPC .......................................................... 716/51
See application file for complete search history.

(56) References Cited

U.S. PATENT DOCUMENTS

| | | | |
|---|---|---|---|
| 6,397,331 B1 * | 5/2002 | Ober ...................... | G06F 21/72 713/165 |
| 10,114,369 B2 | 10/2018 | Newell et al. | |
| 10,650,111 B2 | 5/2020 | Corliss et al. | |
| 10,921,715 B2 | 2/2021 | Corliss et al. | |
| 11,003,075 B2 | 5/2021 | Choi et al. | |
| 2009/0100392 A1 * | 4/2009 | Ivaldi .................. | G03F 7/70541 716/106 |

OTHER PUBLICATIONS

S. Jha and S. K. Jha, "Randomization Based Probabilistic Approach to Detect Trojan Circuits," 2008 11th IEEE High Assurance Systems Engineering Symposium, 2008, pp. 117-124, doi: 10.1109/HASE.2008.37.

(Continued)

*Primary Examiner* — Paul Dinh
(74) *Attorney, Agent, or Firm* — Patterson + Sheridan, LLP

(57) ABSTRACT

The embodiments herein describe authenticating a photomask used to fabricate an IC or a wafer. Because the IC may have been fabricated at a third-party IC manufacturer, the customer may want to ensure the manufacturer did not mistakenly use an incorrect mask, or that the mask was not altered or replaced with a rogue mask by a nefarious actor. That is, the embodiments herein can be used to identify when an IC manufacture (whether trusted or not) mistakenly used the wrong photomask, or to verify that a third-party IC manufacturer did not tamper with or replace the authentic photomask with a rogue mask. Advantageously, the embodiments herein can create a secure IC fabrication process to catch mistakes as well as ensure that non-trusted third-parties did not introduce defects into the IC.

20 Claims, 8 Drawing Sheets

(56) References Cited

OTHER PUBLICATIONS

G. Bloom, B. Narahari and R. Simha, "Fab forensics: Increasing trust in IC fabrication," 2010 IEEE International Conference on Technologies for Homeland Security (HST), 2010, pp. 99-105, doi: 10.1109/THS.2010.5655082.
S. Bhunia, M. S. Hsiao, M. Banga and S. Narasimhan, "Hardware Trojan Attacks: Threat Analysis and Countermeasures," in Proceedings of the IEEE, vol. 102, No. 8, pp. 1229-1247, Aug. 2014, doi: 10.1109/JPROC.2014.2334493.
K. Xiao and M. Tehranipoor, "BISA: Built-in self-authentication for preventing hardware Trojan insertion," 2013 IEEE International Symposium on Hardware-Oriented Security and Trust (HOST), 2013, pp. 45-50, doi: 10.1109/HST.2013.6581564.
J. A. Roy, F. Koushanfar and I. L. Markov, "Ending Piracy of Integrated Circuits," in Computer, vol. 43, No. 10, pp. 30-38, Oct. 2010, doi: 10.1109/MC.2010.284.

\* cited by examiner

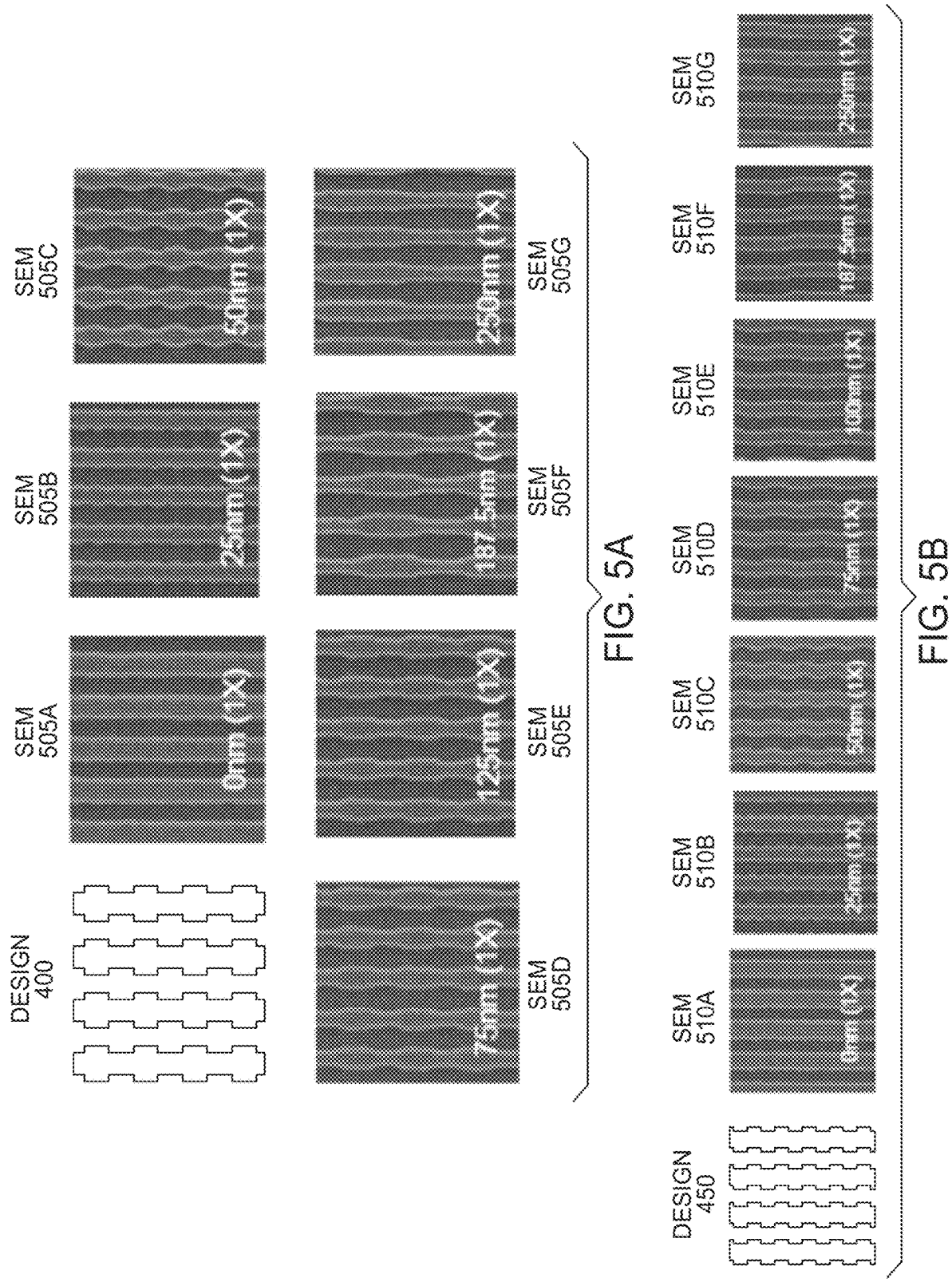

| CORRELATION LENGTH | RMS | ROUGHNESS EXPONENT |
|---|---|---|
| 520 | 1 | 10 |
| 540 | 2 | 12 |
| 560 | 3 | 14 |
| 580 | 4 | 16 |
| 600 | 5 | 18 |
| 620 | 6 | 20 |
| 640 | 7 | 22 |
| 660 | 8 | 24 |
| 680 | 9 | 26 |
| 700 | 10 | 28 |
| 720 | 11 | 30 |

SECURE FINGERPRINTING OF A TRUSTED PHOTOMASK

BACKGROUND

The present invention relates to authenticating a photomask used to fabricate an integrated circuit (IC).

A trusted supply chain for semiconductor chip manufacturing ensures the secure integrity of the IC. When a third-party's (e.g., non-trusted) foundry operations are used in the supply chain, the customer may be unable to verify that the appropriate photomasks were used, or that the photomasks were not tampered with. The use of a non-authenticated photomask, whether used maliciously or by mistake, can result in serious defects in the IC.

One way to detect the introduction of a rogue (non-authentic) photomask is to inspect the printed content on the wafer at each printed level using an inspection technique such as BrightField PLY, implemented with data to wafer matching. Such inspection, however, can be very time consuming and cost prohibitive.

SUMMARY

According to one embodiment of the present invention, a photomask includes a circuit design configured to form a patterned layer of a circuit in an integrated circuit during a fabrication process and an authentication feature configured to form an authentication structure in the integrated circuit for verifying the integrated circuit was formed using the photomask where the authentication feature includes a first plurality of protrusions extending from a first side of a first line.

According to another embodiment of the present invention, a method includes forming a photomask comprising a circuit design and an authentication feature, wherein the authentication feature comprises a first plurality of protrusions extending from a first side of a first line, generating a signature from a portion of an integrated circuit expected to have an authentication structure formed by the authentication feature of the photomask, and after determining the signature matches an expected signature corresponding to the authentication feature, verifying the integrated circuit was fabricated using the photomask.

According to another embodiment of the present invention, a computer program product includes computer-readable program code executable by one or more computer processors to generate a signature from a portion of the integrated circuit expected to have an authentication structure formed by the authentication feature of the photomask where the authentication feature comprises a plurality of protrusions extending from a line, and after determining the signature matches an expected signature corresponding to the authentication feature, verify the integrated circuit was fabricated using the photomask

BRIEF DESCRIPTION OF THE SEVERAL VIEWS OF THE DRAWINGS

FIGS. 5A and 5B illustrate images of different authentication features in a photomask, according to one embodiment.

DETAILED DESCRIPTION

The embodiments herein describe authenticating a photomask (also referred to as a "lithographic mask" or just "mask") used to fabricate an IC or a wafer. Because the IC may have been fabricated at a third-party IC manufacturer, the customer may want to ensure the manufacturer did not mistakenly use an incorrect mask, or that the mask was not altered or replaced with a rogue mask by a nefarious actor. That is, the embodiments herein can be used to identify when an IC manufacture (whether trusted or not) mistakenly used the wrong photomask, or to verify that a third-party IC manufacturer did not tamper with or replace the authentic photomask with a rogue mask. Advantageously, the embodiments herein can create a secure IC fabrication process to catch mistakes as well as ensure that non-trusted third-parties did not introduce defects into the IC.

In one embodiment, authentic photomasks include authentication features in addition to a circuit design. When processing a wafer using the photomasks, in addition to forming the circuit design on the wafer, the authentication features in the masks (which are difficult to detect when viewing the mask) form authentication structures in the wafer. Once the wafer has been processed to generate an IC, a verification process can be used to ensure the IC was fabricated using the authentic photomasks. Because the party who created the photomasks (i.e., the customer) knows where the authentication features are in the masks, it can scan the IC at corresponding locations to derive parameters that can be used to form a signature. Thus, if the signature matches an expected signature, then the customer knows the IC has the appropriate authentication structures, and thus, was fabricated using authentic photomasks.

Figure 1:
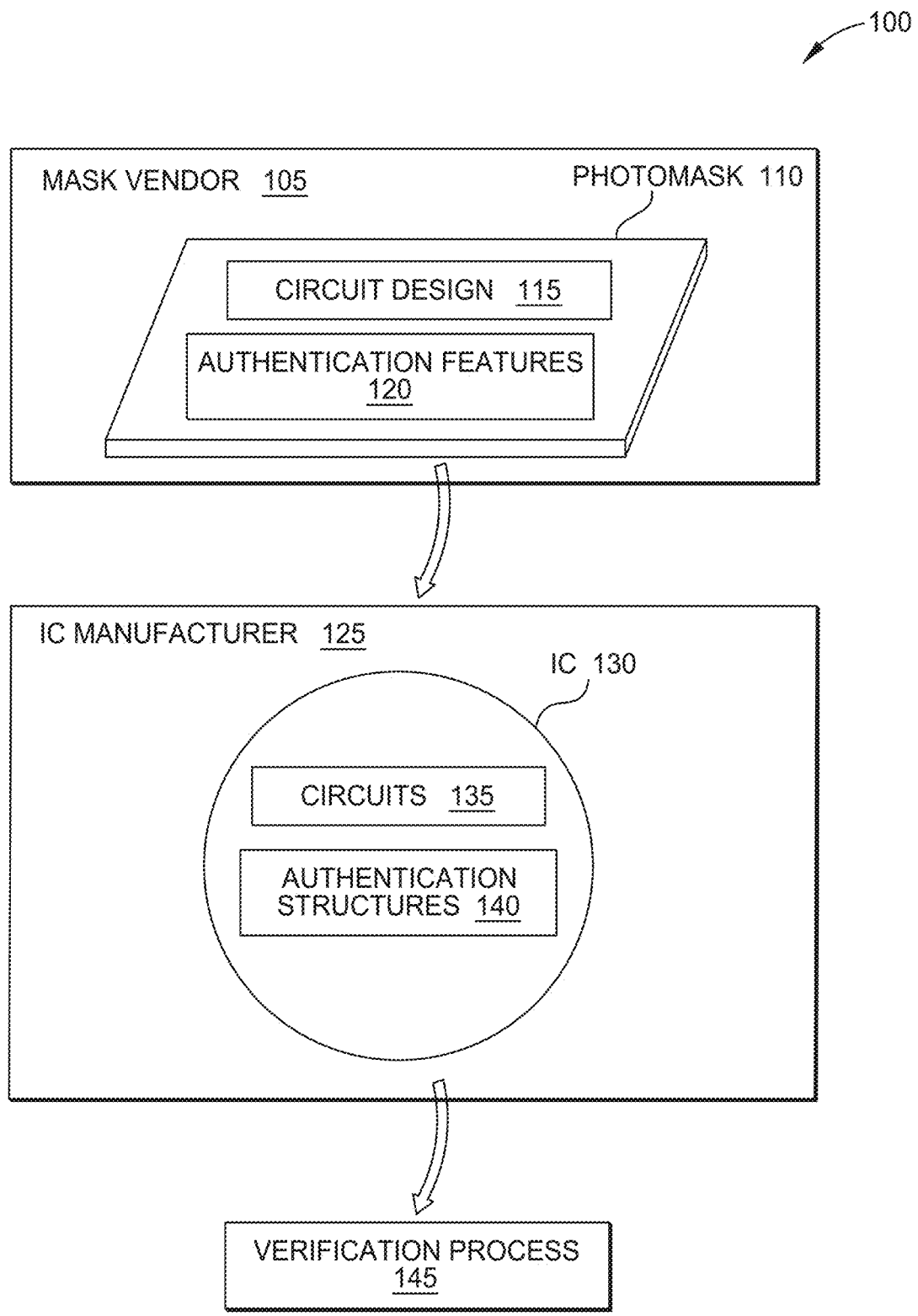
FIG. 1 illustrates a workflow for ensuring a wafer was fabricated using an authentic photomask, according to one embodiment.

FIG. 1 illustrates a workflow 100 for ensuring a wafer was fabricated using an authentic photomask 110, according to one embodiment. The workflow 100 includes a mask vendor 105, an IC manufacturer 125, and a verification process 145. The mask vendor 105 generates the authentic photomask 110. The mask vendor 105 may be the customer, or a third-party manufacturer that is trusted by the customer.

The photomask 110 includes a circuit design 115 and authentication features 120. Masks 110 are used to produce a pattern on a layer of a wafer, e.g., a semiconductor wafer. Typically, several masks are used in turn, each one producing a patterned layer of the completed design, and together they are known as a mask set. Thus, each photomask 110 has a circuit design 115 that forms one layer of the circuit to be patterned on the wafer. In addition to the circuit design 115, the mask vendor 105 adds authentication features 120 that serve as a key or a signature for the mask 110. As discussed below, the authentication features 120 can be used to form authentication structures 140 in an IC 130 which then can be used to verify that an authentic mask 110 was used when fabricating the IC 130.

In one embodiment, all the masks in a mask set used to fabricate the IC 130 include one or more authentication features 120. Alternatively, only a subset of the masks in the mask set may have authentication features 120.

As shown, the photomask 110 is sent to the IC manufacturer 125. However, the customer may not know whether the IC manufacturer used the authentic mask 110 to fabricate the IC 130. For example, the IC manufacturer may be an untrusted third-party. Or the customer may want to ensure that someone did not mistakenly use the wrong mask (or mistakenly omit the mask 110 from the mask set).

If the IC manufacturer 125 used the authentic mask 110, then the IC 130 will have circuits 135 generated from the circuit design 115 and authentication structures 140 generated from the authentication features 120 in the mask 110. If the authentic mask 110 was not used, altered, or damaged, then the IC 130 will likely not have one or more of the authentication structures 140. For example, the mask vendor 105 may spread out the authentication features 120 in the mask 110. Thus, if a nefarious actor tries to replace the authentic mask 110 with a rogue mask that has just a small portion changed to cause a defect in the IC 130 but is otherwise the same, if the authentication features 120 are spread out across the mask 110 it is likely the rogue mask will be missing one or more of the authentication features 120. This will mean the corresponding authentication structures 140 will also be missing from the IC 130. The details of the authentication features 120 and the authentication structures 140 are discussed in more detail below.

The verification process 145 can be used to ensure the IC 130 has the authentication structures 140, and thus, was made using the authentic mask 110 (or a set of authentic masks). Since the customer knows where the authentication structures 140 should be located in the IC 130, she can scan the corresponding portions of the IC 130 to derive parameters such as correlation length of the IC, root mean square (RMS) of a reflected signal, and a roughness exponent of the IC. These parameters can be used to derive a signature for that portion of the IC. If the signature matches an expected signature, then the customer knows the IC 130 was fabricated using the authentic mask 110.

In one embodiment, the verification process 145 can be executed when the first IC 130 of the order is finished. For example, a trusted customer representative can be on-site at the IC manufacture and verify that the IC 130 was made using the authentic mask 110. If so, the representative can instruct the IC manufacture to proceed with fabricating the remaining ICs for the customer order. If not, the representative can work with the IC manufacturer to identify the mistake or the rogue mask. That way, a mistake or nefarious action can be detected before the entire order is complete.

While FIG. 1 illustrates the IC 130 as a wafer, in reality, a wafer that has been through the fabrication process may contain multiple dies that can be diced to form a plurality of individual ICs. In the embodiments herein, an IC is used to describe a wafer that has been processed to include circuits 135, but one of ordinary skill in the art will recognize that a single processed wafer can have hundreds or thousands of dies that can be separated to form individual ICs.

Figure 2:
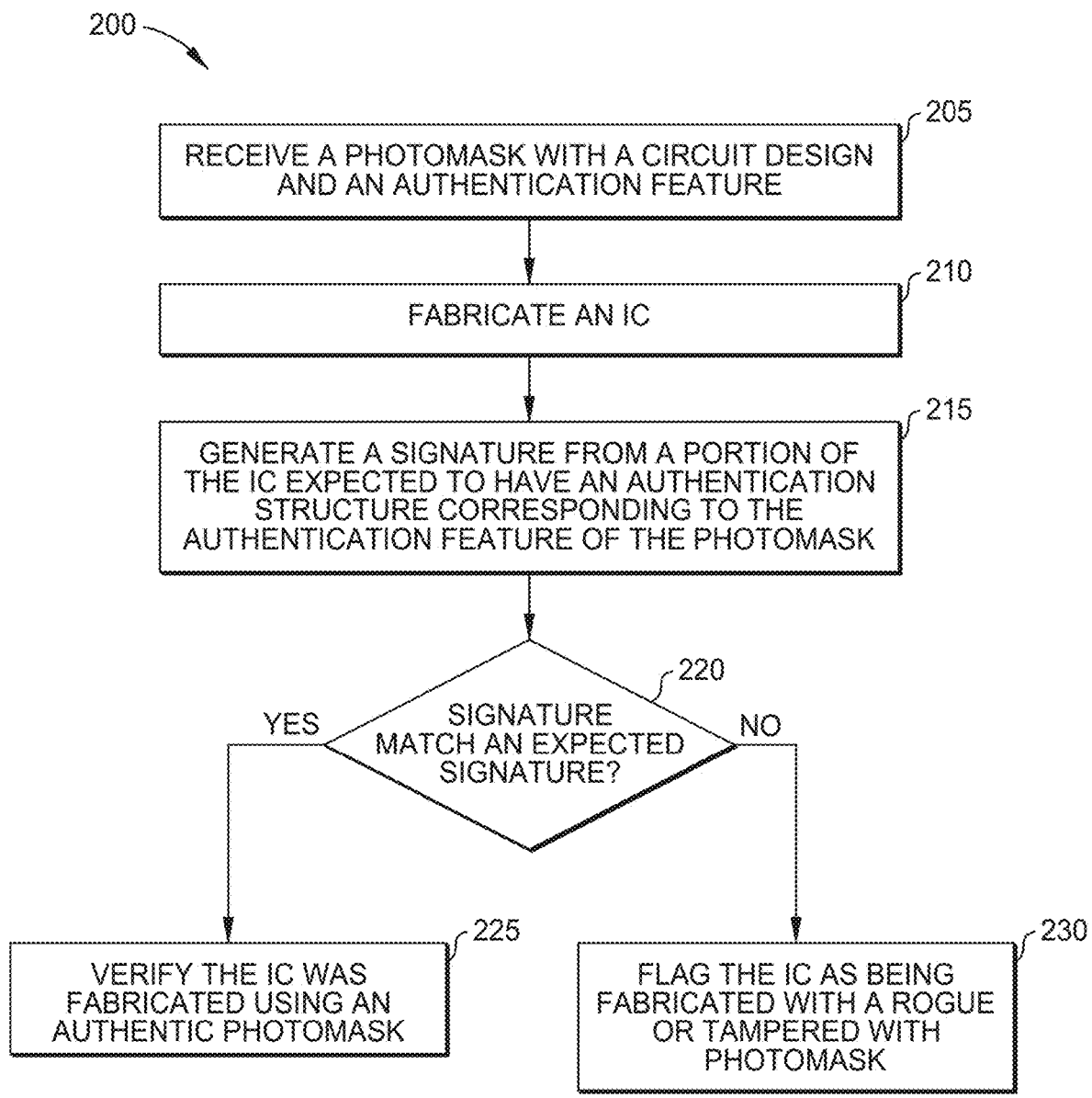
FIG. 2 is a flowchart for checking whether a wafer was fabricated using an authentic photomask, according to one embodiment.

FIG. 2 is a flowchart of a method 200 for checking whether a wafer was processed using an authentic photomask, according to one embodiment. At block 205, an IC manufacturer receives a photomask with a circuit design and at least one authentication feature. In one embodiment, the photomask includes multiple authentication features. Further, these features can be spread out in different areas of the mask. For example, the mask designer may ensure that each unit or component in the circuit design has at least one authentication feature. For instance, the circuit design may include multiple circuit components such as an amplifier, filter, processor core, on-chip memory, etc. The mask designer may ensure that each of these circuit components have at least one authentication feature. Thus, if a nefarious actor copies the authentic mask but alters or replaced just one of these components, he will also damage or remove the authentication feature in the component. Thus, even if the rest of the rogue mask is the exact same as the authentic mask, the rogue mask can still be detected using the method 200.

Figure 3:
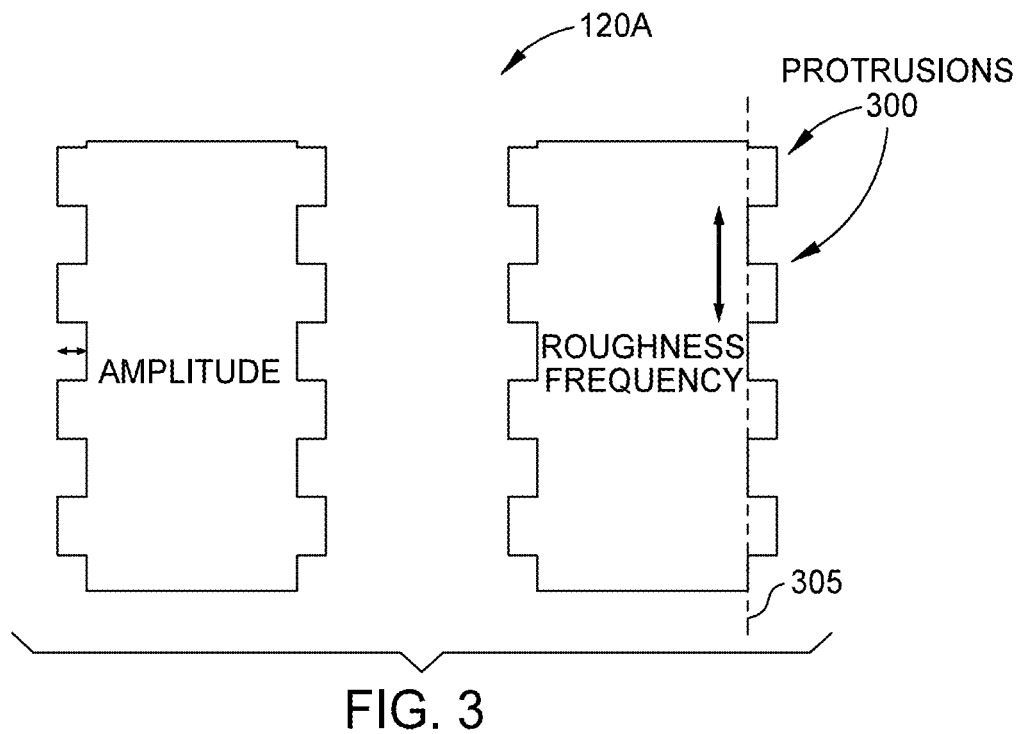
FIG. 3 illustrates different authentication features in a photomask, according to one embodiment.

FIG. 3 illustrates authentication features 120A in a photomask, according to one embodiment. In this example, the features 120A are knobs or protrusions 300 that extend horizontally from a vertically extending line 305 in the photomask design. If someone were to view the photomask under a microscope, the authentication features 120A may appear as mistakes or just poor fidelity in the mask (e.g., an edge roughness). However, these authentication features 120A are intentionally formed in the mask so they will form corresponding authentication structures in the IC or wafer. In one embodiment, the mask designer may add the protrusions 300 to circuit elements that are part of the circuit design (e.g., electrical traces). For example, the protrusions 300 may not have an effect on the circuit design, and thus, the authentication features can be incorporated into elements of the circuit design. Alternatively, the authentication features 120A may be electrically disconnected or separate from the features on the mask that are part of the circuit design to ensure the features 120A do not negatively impact the circuit design. In any case, given that typical masks include billions of different features, it is a nearly impossible task for a nefarious actor to scan an authentic mask to identify all the authentication features 120A in order to ensure those same features are in a rogue mask.

The protrusions 300 can be defined by an amplitude and a roughness frequency. The amplitude dictates the distance the protrusions 300 extend away from the main line 305 while the frequency defines the pitch or separation between neighboring protrusions 300. Different authentication features in the same mask may have different amplitude and roughness frequencies. For example, a first feature 120 at a first location in the mask may have a smaller amplitude but a larger frequency than a second authentication feature 120 at a second location on the same mask. Thus, changing the amplitude and the frequency of the authentication features 120 in a mask gives the mask designer variability to make the authentication features 120 more difficult to detect and then replicate in a rogue mask.

In one embodiment, the amplitudes of the protrusions 300 range from 1-50 nm while the frequency or pitch of the protrusions ranges from 1-1000 nm. However, this may vary depending on the accuracy of the processes used to form the mask and the IC. As processes improve, the amplitudes and frequencies may be able to be less than 1 nm and still result in distinguishable authentication features in the mask and distinguishable authentication structures in the IC.

Further, the authentication features may be defined using different layers in the mask design. For example, a mask formed using an E-beam process typically requires multiple passes to generate the desired designs. Each pass can be defined in a different file. One file can define the passes used to form the circuit design in the mask but a separate file can be used to define the authentication features in the mask. For example, the first file may define the linear, vertical structure of the authentication features 120A in FIG. 3 (e.g., the line 305). However, the second file defines the protrusions 300 which are then added to the sides of the line. This adds greater security since it makes it more difficult for a nefarious actor to evaluate the mask design in order to identify the authentication features 120A.

Figures 4A, 4B:
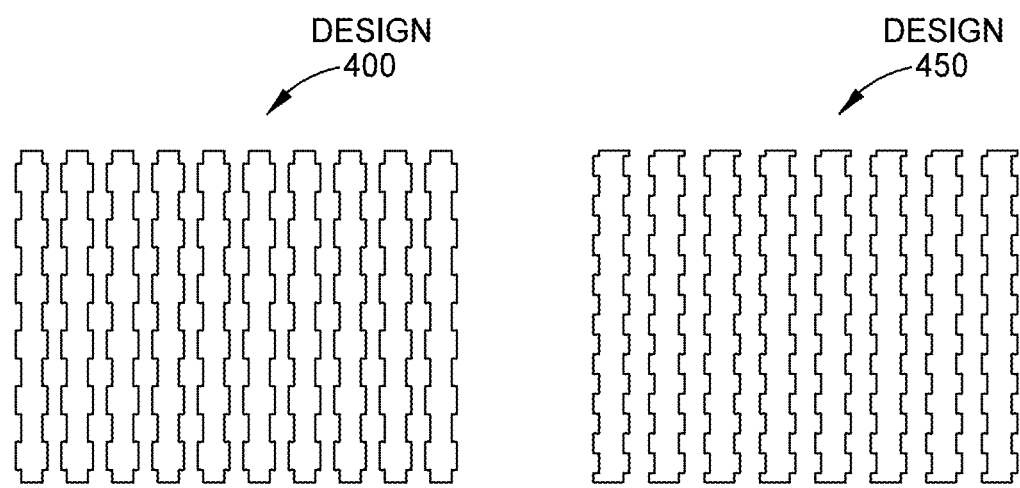
FIGS. 4A and 4B illustrate different patterns of authentication features in a photomask, according to one embodiment.

FIGS. 4A and 4B illustrate different patterns of authentication features in a photomask, according to one embodiment. Specifically, FIG. 4A illustrates a design with symmetric authentication features with a line width roughness (LWR). In this example, the protrusions are in a facing relationship with protrusions in a neighboring vertical line. That is, each of the protrusions is aligned along the same axis (e.g., a horizontal axis) with protrusions on the other lines. The design 400 in FIG. 4A is similar to the authentication features 120A in FIG. 3. FIG. 4B, in contrast, illustrates a design 450 with asymmetric authentication features with a line edge roughness (LER). In this example, the protrusions in neighboring vertical lines are staggered. That is, each of the protrusions is aligned along the same axis (e.g., a horizontal axis) with protrusions on only one side of the other lines. Thus, FIGS. 4A and 4B illustrate different designs for the authentication features. For example, the mask designer may use design 400 for some of the authentication features in the mask but use the design 450 for other authentication features in the same mask.

FIGS. 5A and 5B illustrate images of different patterns of authentication features in a photomask, according to one embodiment. Specifically, FIG. 5A illustrates the design 400 in FIG. 4A as well as scanning electron microscope (SEM) images 505 of masks implementing the design 400. Each of the SEM images 505A-G illustrates a different frequency or pitch of the protrusions in the design 400. That is, SEM image 505A illustrates a 0 nm pitch between the protrusions, the image 505B illustrates a 25 nm pitch between the protrusions, the image 505C illustrates a 50 nm pitch between the protrusions, the image 505D illustrates a 75 nm pitch between the protrusions, the image 505E illustrates a 125 nm pitch between the protrusions, the image 505F illustrates a 187.5 nm pitch between the protrusions, and the image 505G illustrates a 250 nm pitch between the protrusions.

FIG. 5B illustrates the design 450 in FIG. 4B as well as SEM images 510 of masks implementing the design 450 (e.g., a staggered pattern). Each of the SEM images 510A-G illustrates a different frequency or pitch of the protrusions in the design 450. That is, SEM image 510A illustrates a 0 nm pitch between the protrusions, the image 510B illustrates a 25 nm pitch between the protrusions, the image 510C illustrates a 50 nm pitch between the protrusions, the image 510D illustrates a 75 nm pitch between the protrusions, the image 510E illustrates a 125 nm pitch between the protrusions, the image 510F illustrates a 187.5 nm pitch between the protrusions, and the image 510G illustrates a 250 nm pitch between the protrusions.

Thus, FIGS. 5A and 5B illustrate that protrusions with an amplitude that ranges between 0-5 nm can be patterned onto masks with various pitches between the protrusions. Further, FIGS. 5A and 5B permits a person of skill in the art assess the bounds of the technique for a given process.

Returning to the method 200, at block 210, the IC manufacture fabricates an IC. However, the customer may want to verify that the IC manufacturer using the authentic mask (or masks) during the fabrication process (e.g., a mask with one or more of the authentication features discussed in FIGS. 3-5. If the IC manufacturer used the authentic mask, then the IC should have authentication structures formed by the authentication features in the mask.

Figure 6:
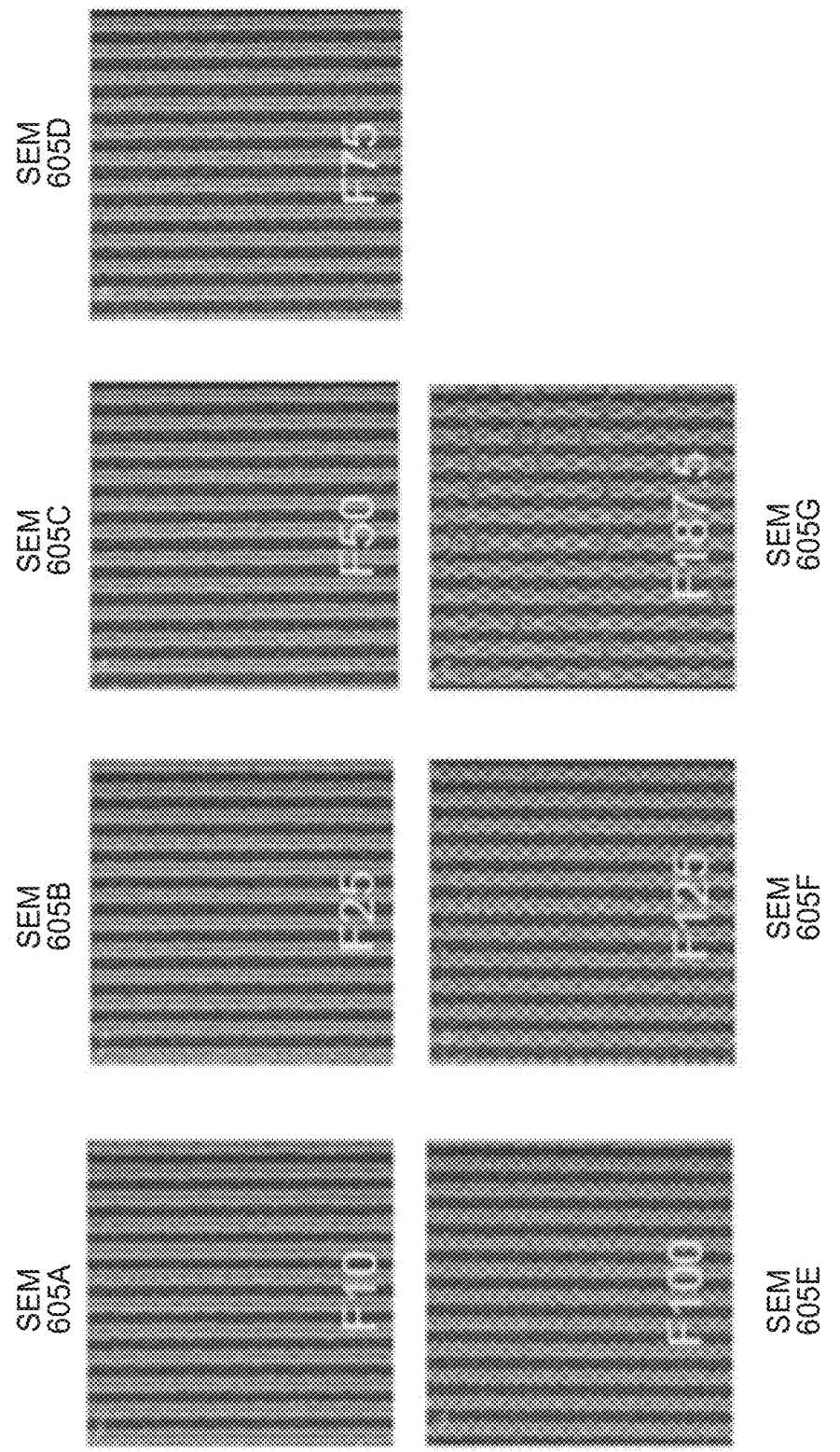
FIGS. 6 and 7 illustrate images of different authentication structures in an IC, according to one embodiment.
Figure 7:
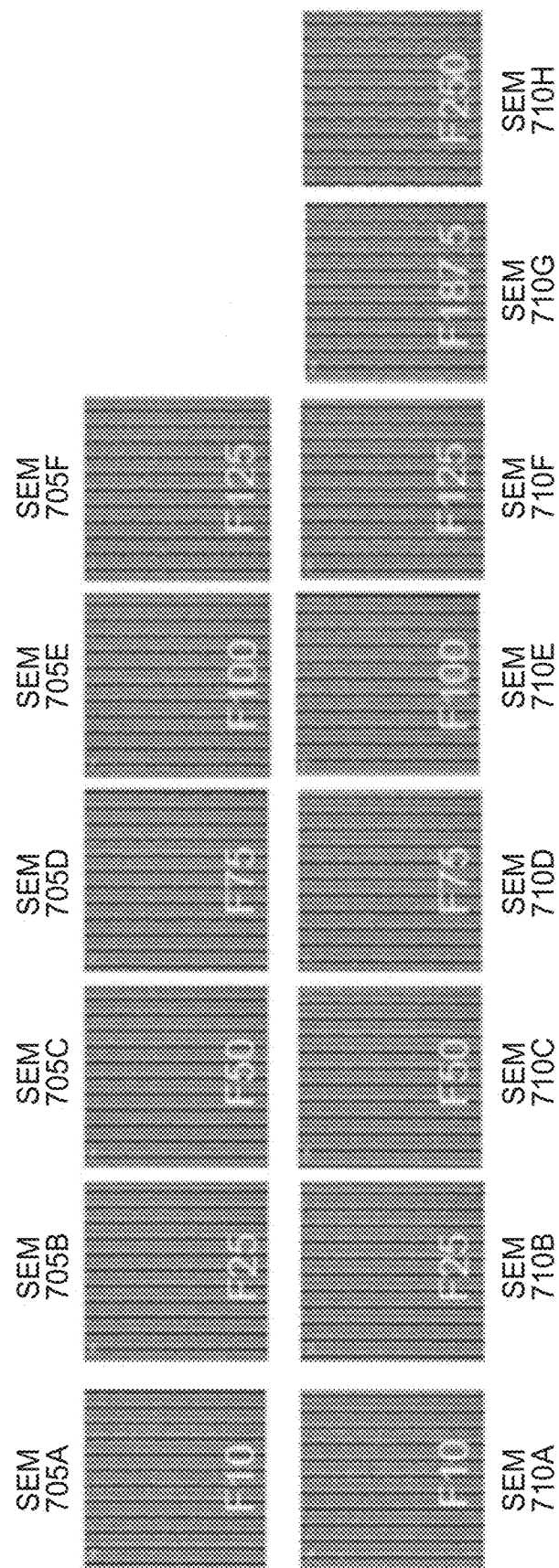

FIGS. 6 and 7 illustrate images of different authentication structures in an IC, according to one embodiment. FIG. 6 illustrates SEM images 605A-G of authentication structures in an IC, formed using authentication features in a photomask. That is, the image 605A illustrates an authentication structure formed from an authentication feature of a mask with pitches of 10 nm where there is a protrusion every 10 nm along the edge (e.g., a frequency of 10 nm (F10)), the image 605B illustrates an authentication structure formed from an authentication feature of a mask with pitches of 25 nm (F25), the image 605C illustrates an authentication structure formed from an authentication feature of a mask with pitches of 50 nm (F50), the image 605D illustrates an authentication structure formed from an authentication feature of a mask with pitches of 75 nm (F75), the image 605E illustrates an authentication structure formed from an authentication feature of a mask with pitches of 100 nm (F100), the image 605F illustrates an authentication structure formed from an authentication feature of a mask with pitches of 125 nm (F125), and the image 605G illustrates an authentication structure formed from an authentication feature of a mask with pitches of 187.5 nm (F187.5).

FIG. 7 illustrates images that show the comparison of symmetric authentication features and asymmetric authentication features for a given amplitude on a wafer. Specifically, the images 705A-F illustrate authentication structures on the wafer resulting from using symmetric authentication features of various frequencies (or pitches) in the photomask while the images 710A-H illustrate authentication structures on the wafer resulting from using asymmetric authentication features of various frequencies (or pitches) in the photomask. Returning to the method 200, at block 215 the customer or its representative generates a signature from a portion of the IC expected to have an authentication structure corresponding to the authentication features of the photomask. In one embodiment, the signature is generated using a scanning system (which can include a processor and memory) that emits an electromagnetic signal onto the portion(s) of the IC that are expected to have the authentication structure(s). The scanning system (or a computing system) can derive parameters from the signal being reflected from the IC. The embodiments herein are not limited to any particular parameter or technique for deriving the parameters. In one embodiment, the parameters are derived using a fitting algorithm. Various examples of parameters are discussed below in FIGS. 8 and 9.

The scanning or computing system can then generate a signature from the parameter or parameters. For example, the parameter can be converted into a signature, or a plurality of parameters can be summed to form the signature. In one embodiment, the parameters are correlated to structures on the IC. That is, the parameters measured by the scanning system represent the physical structures in the IC. Thus, the parameters can be used to generate a signature for the physical structures in the IC. In one embodiment, once the measurement of the structures is complete, a roughness characterization algorithm can be applied to deconvolve the measurement based on multiple factors. These deconvolved measurements can be used to form unique correlations/signature to verify authenticity.

At block 220, the scanning or computing system determines whether the signature matches an expect signature. For example, the scanning system may store predetermined, expected signatures for the authentication structures in the IC. In one embodiment, in a controlled environment, the customer may use the authenticated mask to generate the authentication structures on an IC. The customer can then use the scanning system to scan the authentication structures to determine the expected signatures. The scanning system can have a unique signature for each variant of the authentication structures which corresponds to the various authentication features in the photomask.

When scanning an IC made by a third party, the customer knows what type of authentication feature was used to generate the authentication structures, and thus, knows the signature that should be generated by scanning the IC. If the scanning system outputs the same signature as the expected signature, then the method 200 proceeds to block 225 where the customer verifies (i.e., knows) that the IC was fabricated using an authentic photomask. In one embodiment, the customer or its representative may be on-site at the third party IC manufacturer. Once the IC is verified, the customer can then instruct the IC manufacturer to continue with making all the ICs corresponding to its order. Moreover, to prevent a nefarious actor from inserting a different mask in the middle of completing the customer's order, the customer may randomly test later wafers to ensure they still have the expected signature(s).

If the signature generated at block 215 does not match the expected signature, then the method 200 instead proceeds to block 230 where the customer or its representative flags the IC as being fabricated with a rogue or tampered with photomask. In that case, the IC manufacture can try to identify and remove the rogue mask before repeating the method 200.

Figure 8:
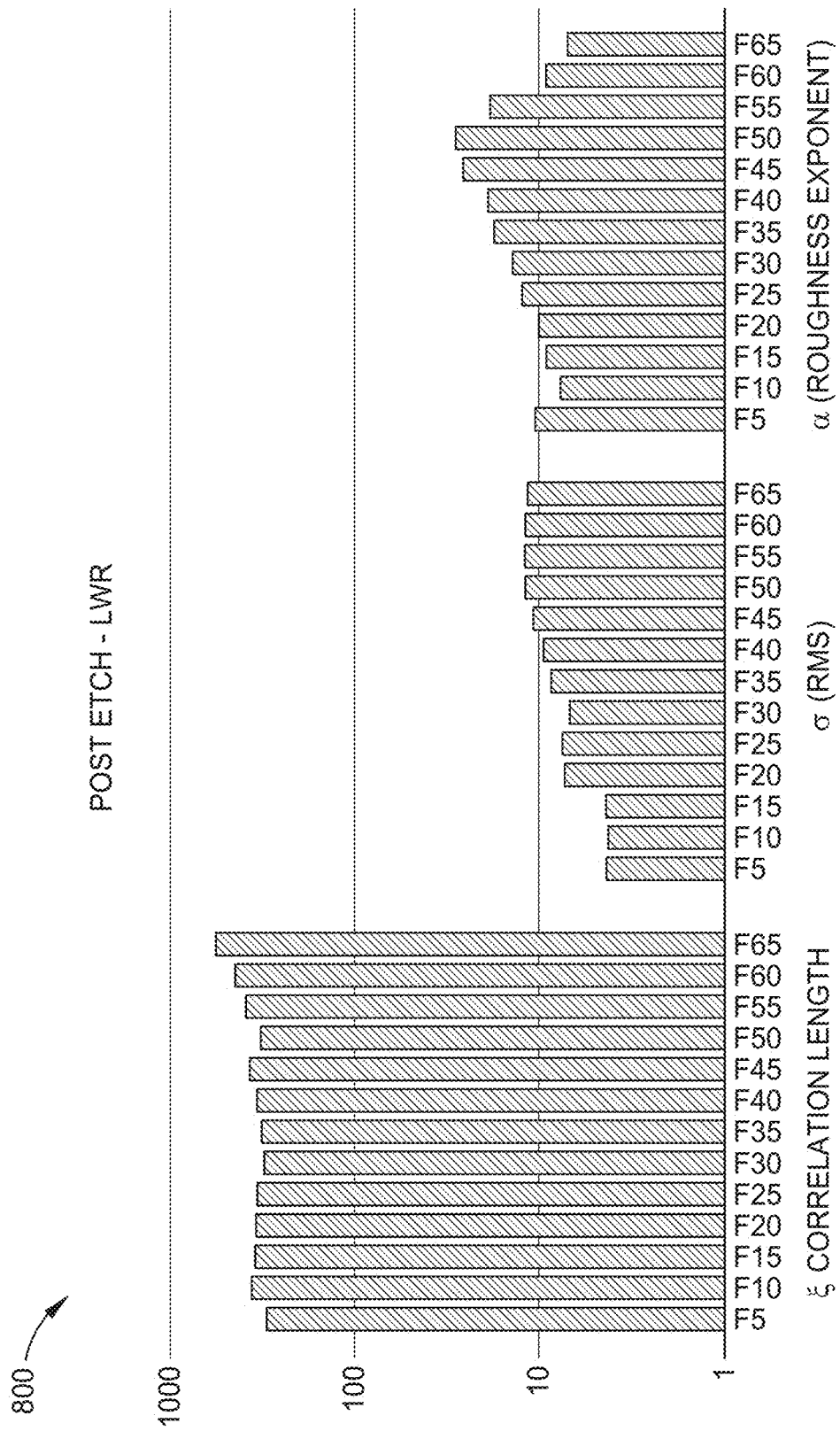
FIG. 8 is a chart illustrating relationships between the authentication features in a photomask and parameters derived from the IC, according to one embodiment.

FIG. 8 is a chart 800 illustrating relationships between the authentication features in a photomask and parameters derived from the IC, according to one embodiment. The chart 800 illustrates three parameters (correlation length of the IC, RMS of a reflected signal, and a roughness exponent of the IC) relative to the frequency or pitches of the protrusions in the authentication features (e.g., F5, F10, F15, etc.). That is, the chart 800 illustrates the values of the parameters measured by the scanning system when scanning an IC with authentication structures formed by authentication features with the F5-F125 frequency or pitches.

The chart 800 illustrates that different values of the frequency or pitch changes the values of the parameters. As such, chart 800 illustrates that the values of the parameters can be correlated to the frequency or pitch of the authentication features so that the values of the parameters can be tied to a particular authentication feature or structure. Thus, by evaluating the values of the parameters (or a signature derived from the parameters), the customer can determine whether the IC has the expected authentication structure.

Figure 9:
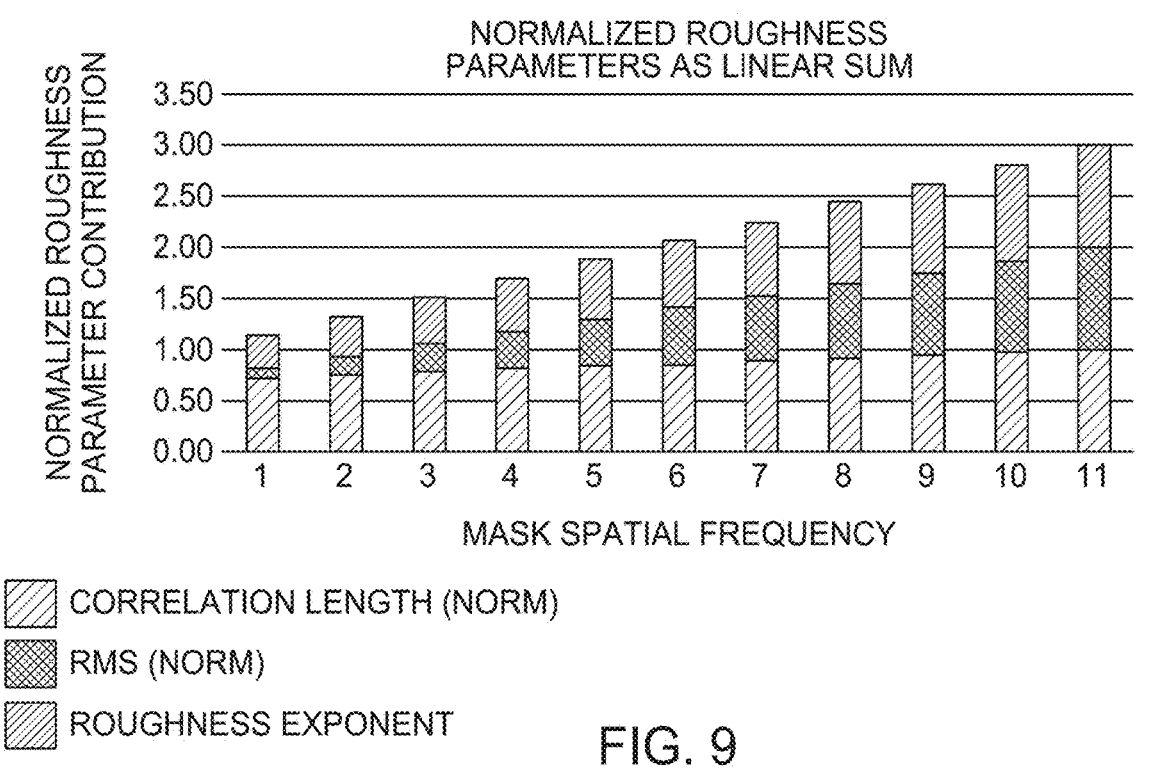
FIG. 9 illustrates information for generating a signature from parameters derived from the IC, according to one embodiment.

FIG. 9 illustrates information for generating a signature from parameters derived from the IC, according to one embodiment. FIG. 9 includes a table 900 listing different combinations of the three parameters shown in FIG. 8. Each of these combinations can correspond to a different authentication structure. For example, the eleven combinations may correspond to eleven different authentication features where the pitch or amplitude of the protrusions is varied in a linear manner. Thus, changing the pitch or amplitude of the authentication feature in the mask can result in different authentication structures which, when scanned, result in the different combinations of the parameters shown in table 900.

FIG. 9 also includes a chart 950 indicating the sum of the parameter values in each row of the table 900. That is, chart 950 illustrates one technique for combining the values of multiple parameters (in this case, by adding their values) to result in a unique signature for an authentication structure or feature. That is, each column in the chart 950 may correspond to a different authentication structure formed by a different authentication feature of a photomask. As mentioned above, experimentation can be used to determine, for a given fabrication process, the combination of parameters that should be expected when scanning an authentication structure formed using a specific authentication feature. The values of the parameters can be summed to generate unique expected signatures for the authentication structures. Thus, when scanning an IC generated by a third-party manufacture, the customer can scan a portion of the IC that should contain a specific authentication structure, generate its signature, and then determine whether its signature matches the expected signature as discussed in the method 200 in FIG. 2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A photomask, comprising:
   a circuit design configured to form a patterned layer of a circuit in an integrated circuit during a fabrication process; and
   an authentication feature configured to form an authentication structure in the integrated circuit for verifying the integrated circuit was formed using the photomask, the authentication feature comprising a first plurality of protrusions extending from a first side of a first line in the photomask.

2. The photomask of claim 1, wherein a pitch between neighboring protrusions of the plurality of protrusions is fixed to result in a protrusion frequency.

3. The photomask of claim 1, wherein the pitch ranges from 1-1000 nm and an amplitude of the protrusions ranges from 1-50 nm.

4. The photomask of claim 1, wherein the authentication feature comprises a second plurality of protrusions extending from a second side of the first line, opposite the first side of the first line.

5. The photomask of claim 4, wherein each one of the first plurality of protrusions is directly opposite a corresponding one of the second plurality of protrusions.

6. The photomask of claim 5, wherein the authentication feature comprises a second line, parallel with the first line, with a third plurality of protrusions, wherein each of the third plurality of protrusions is disposed along a same axis as corresponding ones of the first and second pluralities of protrusions.

7. The photomask of claim 4, wherein the first and second pluralities of protrusions are staggered so that none of the first plurality of protrusions is directly opposite one of the second plurality of protrusions.

8. The photomask of claim 7, wherein the authentication feature comprises a second line, parallel with the first line, with a third plurality of protrusions, wherein each of the third plurality of protrusions is disposed along a same axis as a corresponding one of the first or second pluralities of protrusions, but not both.

9. The photomask of claim 1, further comprising:
a plurality of authentication features distributed throughout the photomask, the plurality of authentication features each comprising at least one line with a plurality of protrusions.

10. The photomask of claim 9, wherein a first one of the plurality of authentication features has a corresponding plurality of protrusions with a different pitch or amplitude as a second one of the plurality of authentication features.

11. A method comprising:
forming a photomask comprising a circuit design and an authentication feature, wherein the authentication feature comprises a first plurality of protrusions extending from a first side of a first line in the photomask;
generating a signature from a portion of an integrated circuit expected to have an authentication structure formed by the authentication feature of the photomask; and
after determining the signature matches an expected signature corresponding to the authentication feature, verifying the integrated circuit was fabricated using the photomask.

12. The method of claim 11, wherein a pitch between neighboring protrusions of the plurality of protrusions is fixed to result in a protrusion frequency.

13. The method of claim 11, wherein the pitch ranges from 1-1000 nm and an amplitude ranges from 1-50 nm.

14. The method of claim 11, wherein the authentication feature comprises a second plurality of protrusions extending from a second side of the first line, opposite the first side of the first line.

15. The method of claim 14, wherein each one of the first plurality of protrusions is directly opposite a corresponding one of the second plurality of protrusions.

16. The method of claim 14, wherein the authentication feature comprises a second line, parallel with the first line, with a third plurality of protrusions, wherein each of the third plurality of protrusions is disposed along a same axis as corresponding ones of the first and second pluralities of protrusions.

17. The method of claim 14, wherein the first and second pluralities of protrusions are staggered so that none of the first plurality of protrusions is directly opposite one of the second plurality of protrusions.

18. The method of claim 14, generating the signature further comprises:
scanning the portion of the integrated circuit using an electromagnetic signal;
generating at least one parameter based on reflections of the electromagnetic signal, wherein a value of the at least one parameter correlates to the authentication structure formed using the authentication feature in the photomask; and
generating the signature based on the at least one parameter.

19. The method of claim 14, wherein the photomask comprises a plurality of authentication features distributed throughout the photomask, the method further comprising:
generating a plurality of signatures from different portions of the integrated circuit expected to have authentication structures formed by the plurality of authentication features of the photomask,
wherein the integrated circuit is verified as being fabricated using the photomask so long as all the plurality of signatures match expected signatures corresponding to the plurality of authentication features.

20. A computer program product for verifying an integrated circuit was formed from a photomask comprising an authentication feature, the computer program product comprising:
a computer-readable storage medium having computer-readable program code embodied therewith, the computer-readable program code executable by one or more computer processors to:
generate a signature from a portion of the integrated circuit expected to have an authentication structure formed by the authentication feature of the photomask, wherein the authentication feature comprises a plurality of protrusions extending from a line in the photomask; and
after determining the signature matches an expected signature corresponding to the authentication feature, verify the integrated circuit was fabricated using the photomask.

* * * * *